July 22, 1958 R. B. MacARTHUR ET AL 2,844,337
AIRCRAFT CONTROL ARRANGEMENT INCORPORATING
DEFLECTABLE SURFACE AND BOUNDARY
LAYER CONTROL JETS
Filed Nov. 23, 1956 3 Sheets-Sheet 1

INVENTORS
ROBERT B. MAC ARTHUR
DWIGHT F. SWEARINGEN
BY
ATTORNEY

July 22, 1958 R. B. MacARTHUR ET AL 2,844,337
AIRCRAFT CONTROL ARRANGEMENT INCORPORATING
DEFLECTABLE SURFACE AND BOUNDARY
LAYER CONTROL JETS
Filed Nov. 23, 1956 3 Sheets-Sheet 2

INVENTORS
ROBERT B. MAC ARTHUR
DWIGHT F. SWEARINGEN
BY
ATTORNEY

INVENTORS
ROBERT B. MAC ARTHUR
DWIGHT F. SWEARINGEN
BY

ATTORNEY

United States Patent Office 2,844,337
Patented July 22, 1958

2,844,337

AIRCRAFT CONTROL ARRANGEMENT INCORPORATING DEFLECTABLE SURFACE AND BOUNDARY LAYER CONTROL JETS

Robert B. MacArthur, Los Angeles, and Dwight F. Swearingen, Hawthorne, Calif., assignors to North American Aviation, Inc.

Application November 23, 1956, Serial No. 623,910

5 Claims. (Cl. 244—42)

This invention pertains to an aircraft control arrangement and more particularly to a design where boundary layer control air is discharged over an airfoil surface.

It is well known in the art that control of the boundary layer air over airfoil surfaces can result in greatly improved aircraft performance. Removal of the relatively inert boundary layer of air on such a surface gives greater control over lift and drag forces, and is especially important during landing and certain slow speed maneuvers of the aircraft. The provision of a suitable boundary layer control arrangement is of particular importance for supersonic aircraft in reducing the landing speed of such aircraft. It has been proposed to control the boundary layer by pulling the boundary layer inwardly from the surface by a suction force. This may be accomplished, for example, by providing a perforated leading edge surface on a wing. Such arrangements have not proven to be entirely satisfactory, however, involving design and installation problems, and relatively complicated, heavy structure.

Accordingly, it is an object of this invention to provide an arrangement for removing the boundary layer from an airfoil surface by air discharge. Another object of this invention is to provide a boundary layer control arrangement of great effectiveness, simplicity, and economical, light weight construction. A further object of this invention is to provide a boundary layer control arrangement wherein control air is discharged tangentially to the airfoil surface. Yet another object of this invention is to provide a boundary layer control arrangement wherein a seal is effected between upper and lower surfaces of a combination of fixed and movable airfoils. These and other objects will be made more clear hereinafter by reference to the following detailed description and to the drawing in which:

Fig. 5 is a fragmentary sectional view showing a modified form in which two seals are incorporated between the flap and the wing.

Figure 1:
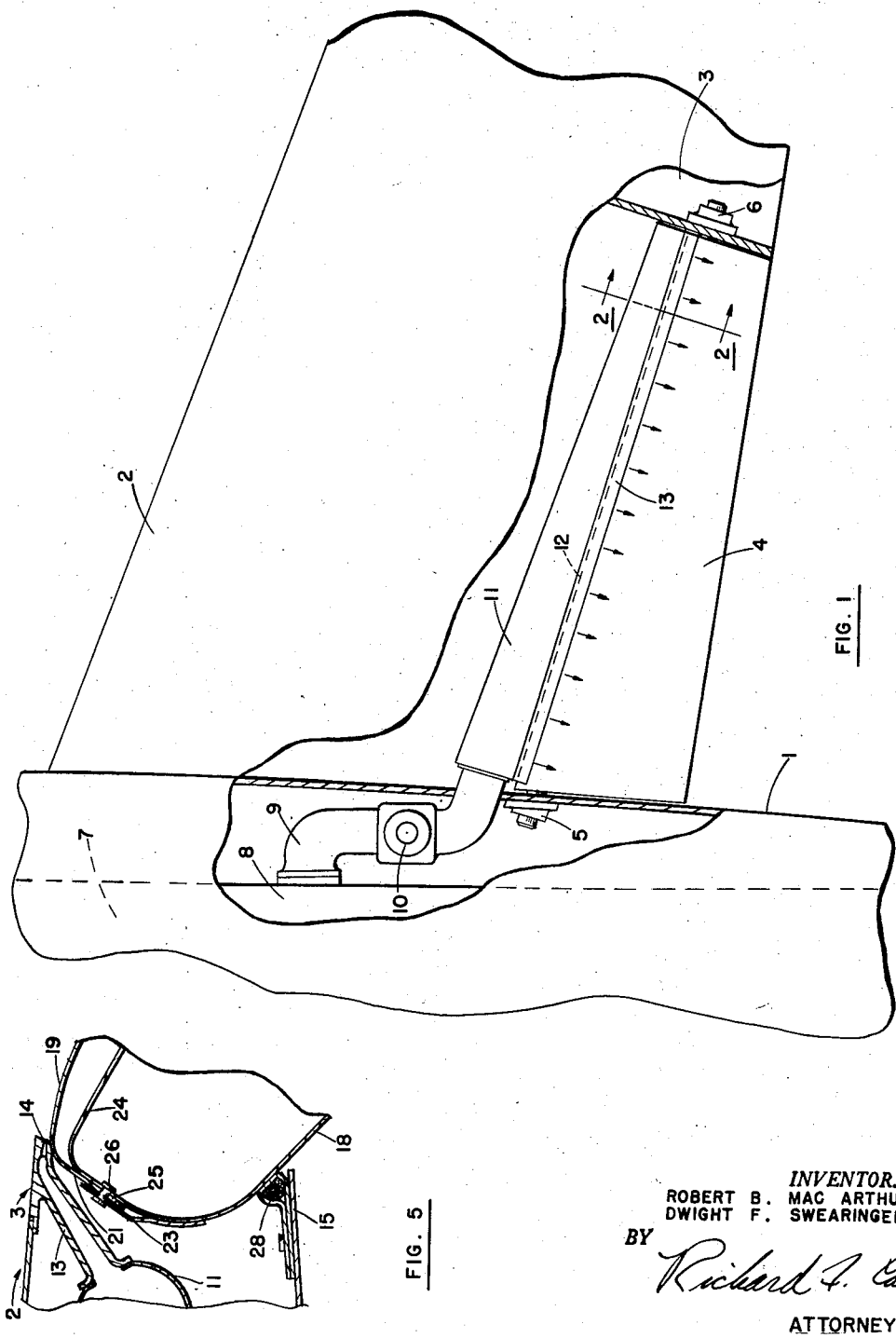
Fig. 1 is a top plan view, partially broken away, of an aircraft and wing arrangement illustrating the overall provisions of this invention.

As illustrated generally in plan form in Fig. 1, the control arrangement of this invention is applied to an aircraft having fuselage 1 from which projects wing 2. At trailing edge portion 3 of the wing a flap 4 is journalled at 5 and 6 for pivotal movement relative to the wing with its axis of rotation substantially parallel to the trailing edge of the wing. It should be understood that the provisions of this invention are equally applicable to any aileron installation or other design for movable control surfaces. By reason of its pivotal mounting flap 4 may assume the raised position of Fig. 1 where it is in alignment with the wing, or a lowered position which may be at substantially 45° thereto. It is when the flap is in the lowered position for relatively slow speed flight that it is desired to remove the boundary layer air from over the upper surface of the flap to increase its efficiency.

The aircraft illustrated is powered by a jet propulsion engine 7 which includes a compressor section 8 for supplying the burners with compressed air. According to the provisions of this invention an outlet 9 is connected to the compressor of the engine to bleed air therefrom as controlled by valve 10. The valve connects to a manifold 11 which extends in the wing at the trailing edge thereof adjacent the leading edge 12 of the flap. The manifold is preferably tapered for accommodating various air flow requirements throughout its length.

Figure 2:
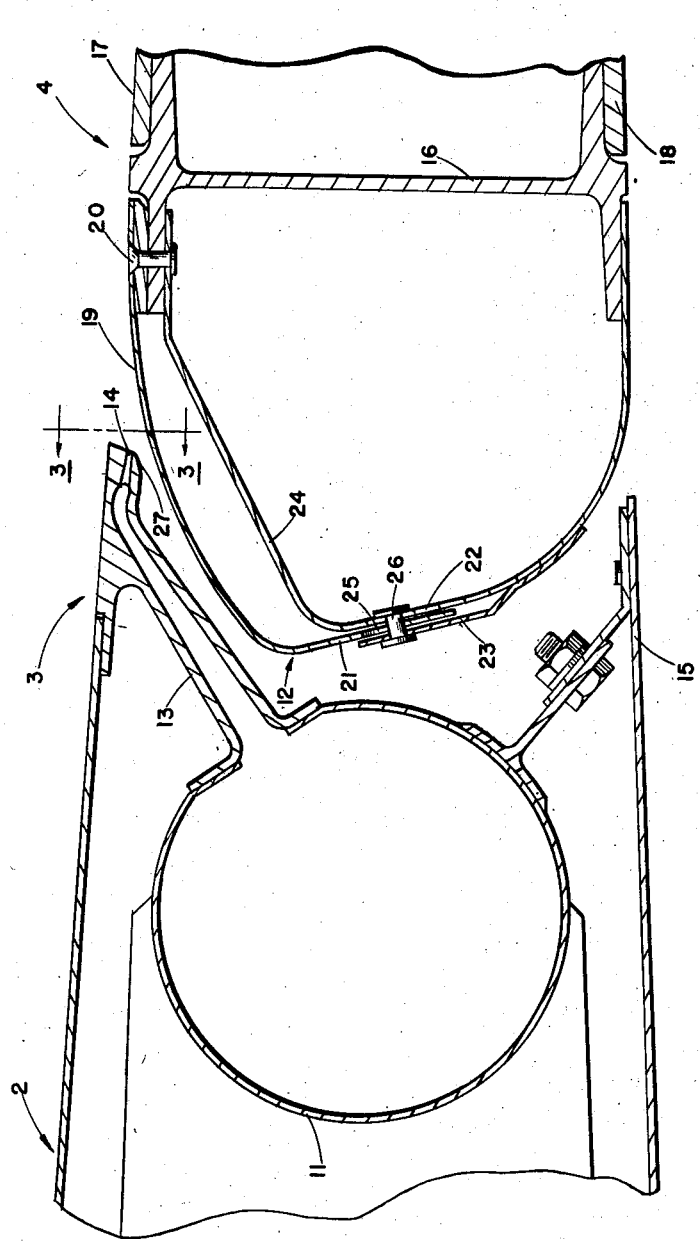
Fig. 2 is a sectional view taken along line 2—2 of Fig. 1.

With reference now to Fig. 2 the cross section of the manifold may be seen with its connection to nozzles 13 which extend the length of the flap. These nozzles terminates in rearwardly directed discharge slots 14 which may be seen in elevation in Fig. 3. These slots are positioned so as to provide a substantially continuous blanket of air throughout the length of the nozzle area. The nozzles project over leading edge 12 of the flap which is received in a recess or channel formed by the nozzles and lower skin 15 of the wing.

The flap itself includes a spanwise extending beam 16 interconnecting upper skin 17 and lower skin 18. The upper leading edge portion 19 of the flap is constructed of resilient, deflectable sheet material. This portion of the flap is fixed to the beam at 20 by suitable means such as rivets. The forward portion 21 of sheet 19 is free and slidable relative to the portion 22 of the lower skin which it engages. Portion 21 of sheet 18 is received in a channel formed by member 23 which is secured to the lower skin of the flap. A slot 25 is provided in sheet 19 and receives rivet 26 which, together with members 22 and 23, serves to guide the forward free end of sheet 19 and limit its travel. The flexible sheet extends over a rigid structural inner skin 24.

Figure 3:
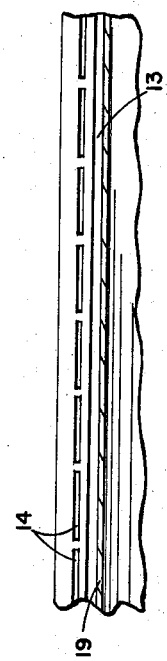
Fig. 3 is a fragmentary detail view illustrating the outlet nozzle arrangement for the boundary layer air discharge.
Figure 4:
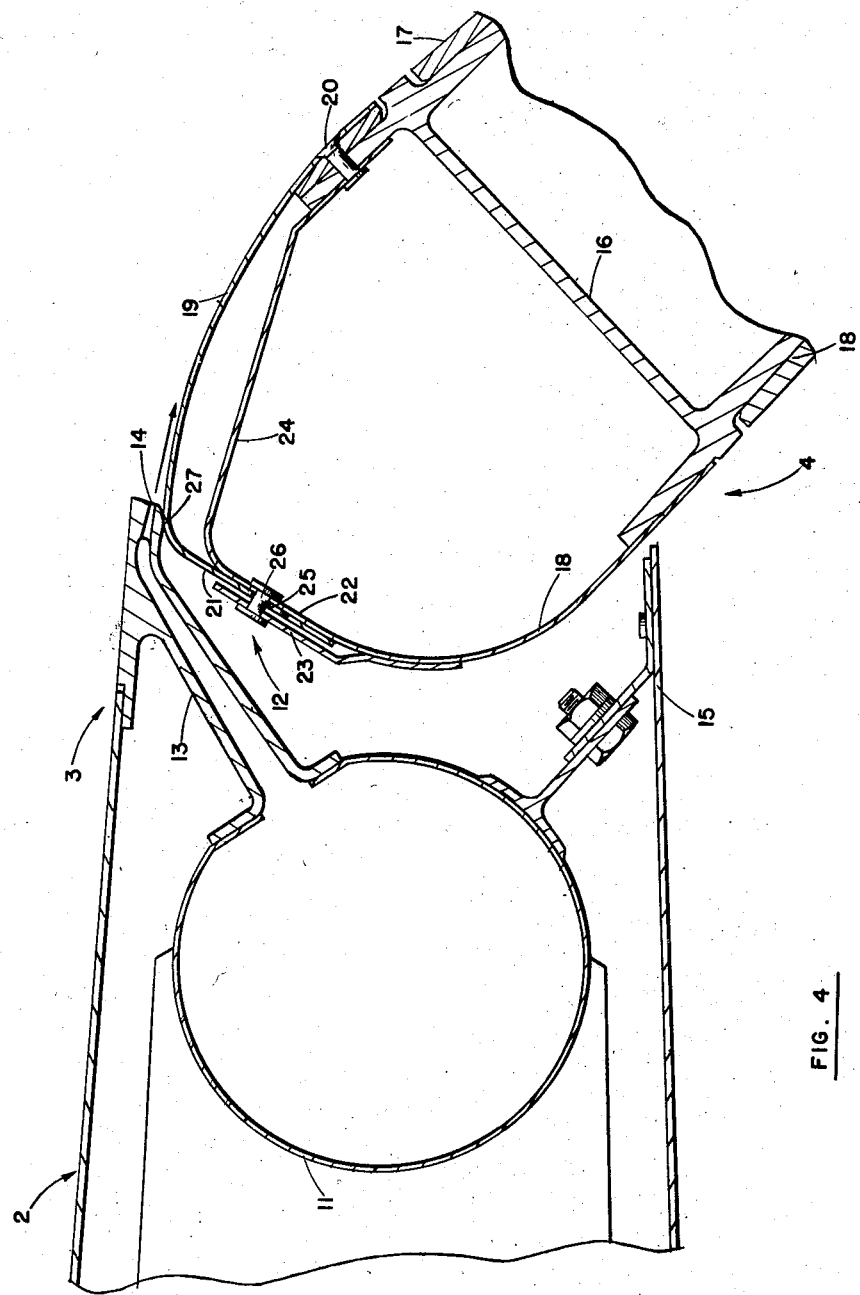
Fig. 4 is a sectional view similar to Fig. 2 but with the flap in a lowered position.

In operation of the flap it will be pivoted from the raised position of Figs. 1 and 3 to the lowered position of Fig. 4. During such movement the forward upper portion of sheet 19 engages the bottom edge of the nozzles at 27. This portion of the nozzles acts as an abutment, and continued movement of the flap causes the sheet member 19 to deflect to the position of Fig. 4. At this time valve 10 may be opened to cause an air discharge across the upper surface of sheet member 19. It should be observed that when the flap is in the lowered position, with sheet 19 deflected, the discharge from the nozzles is substantially tangential to the upper surface of this member. This provides the most efficient air discharge pattern for controlling the boundary layer. At the same time the engagement of the lower edge of the nozzles with the upper surface of member 19 effects a seal between those two members which precludes air flow between the upper and lower surfaces of the airfoil between the trailing edge of the wing and the leading edge of the flap. This further increases the aerodynamic efficiency of the aircraft. This seal is accomplished without a weight penalty by avoiding necessity for additional sealing members along this location. Also, the seal is entirely metallic and therefore will not be adversely affected by high temperatures. Furthermore, the fact that the sheet member 19 at the upper leading edge surface of the flap is deflectable means that the flap may have its optimum configuration when in the raised position while achieving a different shape for boundary layer control purposes when the flap is lowered. In this manner, a simple, effective, economical and highly efficient boundary layer control arrangement is realized.

If desired the design may include the modification of Fig. 5. Here an additional compressible sealing member 28 is provided at the trailing edge of the airfoil at its lower surface portion. This seal is engaged by the lower skin of the flap when the flap has been lowered. This, in addition to the seal already effected between the nozzle and sheet 19, positively prevents any flow into the area between the wing trailing edge and the flap leading edge.

It may be seen by the foregoing, therefore, that we have provided a simple and effective boundary layer control arrangement whereby air is discharged tangentially to the control surface where the boundary layer is to be removed yet the control surface assumes its most efficient shape for all conditions.

The foregoing detailed description is to be understood as given by way of illustration and example only, the spirit and scope of this invention being limited solely by the appended claims.

We claim:

1. In combination, a primary airfoil having a rearwardly opening recess within its trailing edge defined by upper and lower fixed trailing edge portions, a movable control surface member having spaced upper and lower surfaces and having its leading edge mounted for pivotation within said recess, said control surface member having its leading edge comprised of rigid upper and lower connecting skin members and forming a load sustaining auxiliary airfoil, a deflectable sheet metal panel having its rearward end rigidly attached to said control surface member on its upper surface and extending forwardly and downwardly around said upper skin member in spaced relation therefrom to form a predeterminately positioned aerodynamically efficient surface contour for both undeflected and deflected positions of said control member as it is pivoted relative to said primary airfoil, said panel having its forward end slidably secured to the leading edge of said control surface member for limited movement relative thereto whereby said panel may be deflected downwardly relative to said rigid upper skin member, the upper fixed trailing edge portion of said primary airfoil including an abutment portion projecting over said deflectable panel and engageable thereby upon pivotal movement of said control surface member to thereby deflect said panel and effect a seal between said abutment portion and said deflectable panel, said abutment portion being provided with discharge nozzles therein aligned to discharge substantially rearwardly across said deflectable panel and substantially tangentially thereto when said control surface member is in a deflected position.

2. The combination recited in claim 1, including, in addition, a continuous elongated seal member interposed between the lower skin member of said movable control surface member and the lower fixed trailing edge portion of said primary airfoil when said control surface member is in a deflected position for preventing flow of air through said recess from beneath said primary airfoil and control surface member to the region above said primary airfoil and control surface member.

3. In combination, an aircraft having an airfoil with a rearwardly opening recess within its trailing edge defined by upper and lower fixed trailing edge portions, a movable control surface member pivotally mounted relative to said airfoil with the leading edge of said control surface member being positioned movably within said recess, abutment means at said upper fixed trailing edge portion, said control surface member having its leading edge comprised of rigid upper and lower connecting skin members forming an uninterrupted, load sustaining integral portion of said control surface member, an auxiliary deflectable sheet metal panel covering the upper skin portion of the leading edge and having its rearward end rigidly attached to said control surface member on its upper surface, said panel extending forwardly and downwardly around said upper skin member in spaced relation therefrom to form a predeterminately positioned aerodynamically efficient surface contour for deflected as well as undeflected positions of said control surface member as it is pivoted relative to said airfoil, means slidably securing the forwardmost end of said panel to the leading edge of said fixed lower skin member for limited movement substantially parallel thereto whereby said panel may deflect when in contact with said abutment means, and nozzle discharge means above said abutment means, said nozzle discharge means being directed substantially rearwardly and tangentially to the deflectable panel of said control surface member when said control surface member is in a deflected position for discharging air along upper surface portions of said control surface member to thereby energize and control the boundary layer air thereon.

4. The combination as recited in claim 3, in which said aircraft is provided with a jet propulsion engine having a compressor, and said air supply means comprises a bleed-off from the jet engine compressor, and a manifold connected thereto, said manifold supplying said nozzle discharge means for providing boundary layer energization discharge air thereto.

5. In combination, an airfoil having a rearwardly opening recess within its trailing edge defined by upper and lower fixed trailing edge portions, a movable control surface member having spaced upper and lower surfaces and being pivotally mounted relative to said airfoil with the leading edge of said control surface member being movably positioned within said recess, said control surface member having its leading edge comprised of rigid upper and lower connecting skin members forming a fully enclosed, load sustaining control surface member, an auxiliary deflectable sheet metal fairing panel having its rearward end rigidly attached to said control surface member on the upper surface thereof and cantilevered therefrom to extend forwardly and downwardly around said upper skin member in spaced relation therefrom to form a predeterminately positioned aerodynamically efficient surface contour for deflected and undeflected positions of said control member as it is pivoted relative to said airfoil, a channel member attached to said lower skin member and forming therewith a telescopic joint for sliding reception of the cantilevered lower movable end of said fairing panel, an abutment at the upper fixed trailing edge portion of said airfoil substantially complementary to and extending over the leading edge upper skin member of said control surface member, said abutment being sealingly engaged by said fairing panel of said control surface member during at least a portion of the pivotal movement of said control surface member, said fairing panel being deflected by said abutment upon such movement of the control surface member, said abutment including slot means therein defining nozzles, said nozzles being positioned continuously along the length of said upper trailing edge portion so as to discharge substantially tangentially rearwardly across said fairing panel when said control surface member is pivoted to an angularly deflected position relative to said airfoil.

References Cited in the file of this patent
UNITED STATES PATENTS

| | | |
|---|---|---|
| 2,458,896 | Darby | Jan. 11, 1949 |
| 2,585,676 | Poisson-Quinton | Feb. 12, 1952 |